United States Patent [19]

Reynolds, deceased et al.

[11] 4,416,249
[45] Nov. 22, 1983

[54] OVEN BURNER RADIANT

[76] Inventors: Howard R. Reynolds, deceased, late of Los Angeles, Calif.; by Pauline N. Reynolds, executrix, 1131 East Wakeham Ave., Santa Ana, Calif. 92705

[21] Appl. No.: 410,534

[22] Filed: Aug. 23, 1982

Related U.S. Application Data

[63] Continuation of Ser. No. 900,588, Apr. 27, 1978, abandoned, and a continuation-in-part of Ser. No. 749,316, Dec. 10, 1976, Pat. No. 4,144,870.

[51] Int. Cl.³ .............................................. F24C 3/00
[52] U.S. Cl. ................................................. 126/41 R
[58] Field of Search ................. 126/41 R, 41 A, 41 B, 126/41 C, 41 D, 41 E, 273, 19 R, 92 AC

[56] References Cited

U.S. PATENT DOCUMENTS

| 2,235,886 | 3/1941 | Kahn | 126/41 |
| 2,522,935 | 9/1950 | Farrall | 126/41 R |
| 3,322,112 | 5/1967 | Huff et al. | 126/41 R |
| 3,334,620 | 8/1967 | De Werth | 126/41 R |
| 3,547,099 | 12/1970 | McArthur | 126/21 R |
| 3,638,634 | 2/1972 | Bolitho | 126/41 R |
| 4,112,912 | 9/1978 | Ballentine | 126/41 R |

FOREIGN PATENT DOCUMENTS

| 158765 | 2/1921 | United Kingdom | 126/41 |

Primary Examiner—Carroll B. Dority, Jr.
Attorney, Agent, or Firm—William H. Maxwell

[57] ABSTRACT

A radiant especially adapted for the top burner heat in an oven broiler and comprised of low mass metalic sheet formed to follow the flames emanating at opposite sides of a burner tube for the efficient absorption of heat therefrom, the outer margins of the sheet being turned upward at the flame tip to disperse the burnt gases in heating an overlying griddle or the like, and spaced from the tube coextensively thereof for secondary induction of combustion air.

6 Claims, 7 Drawing Figures

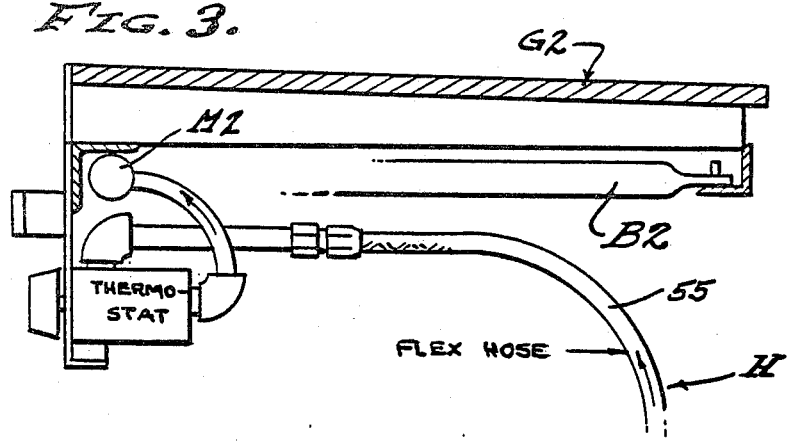
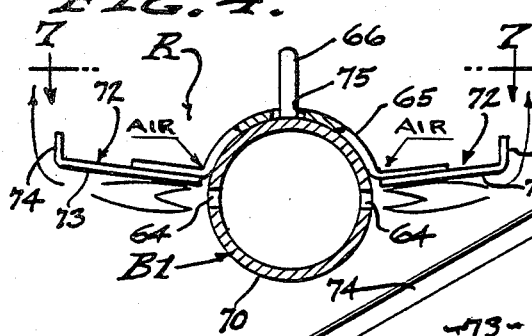
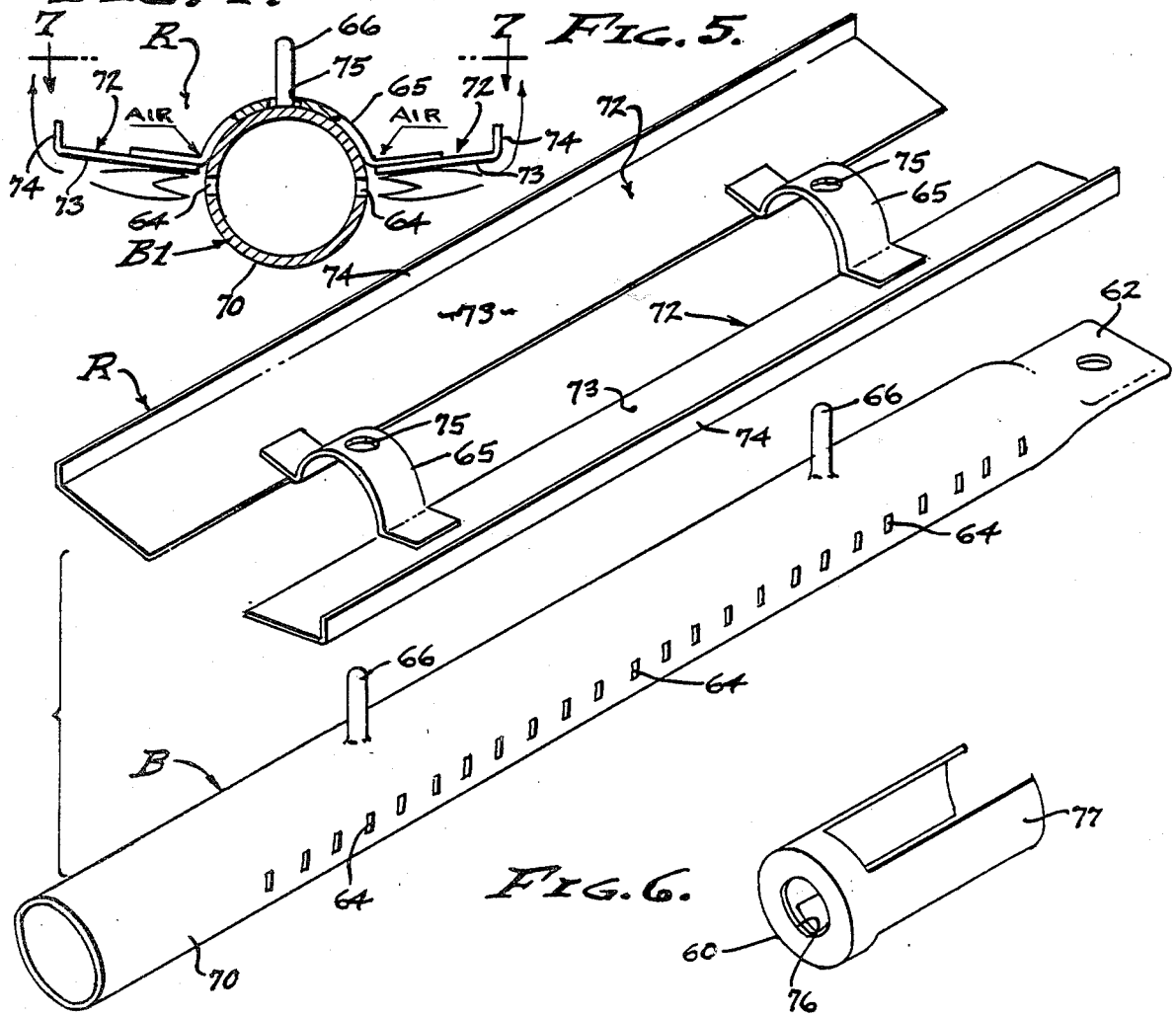

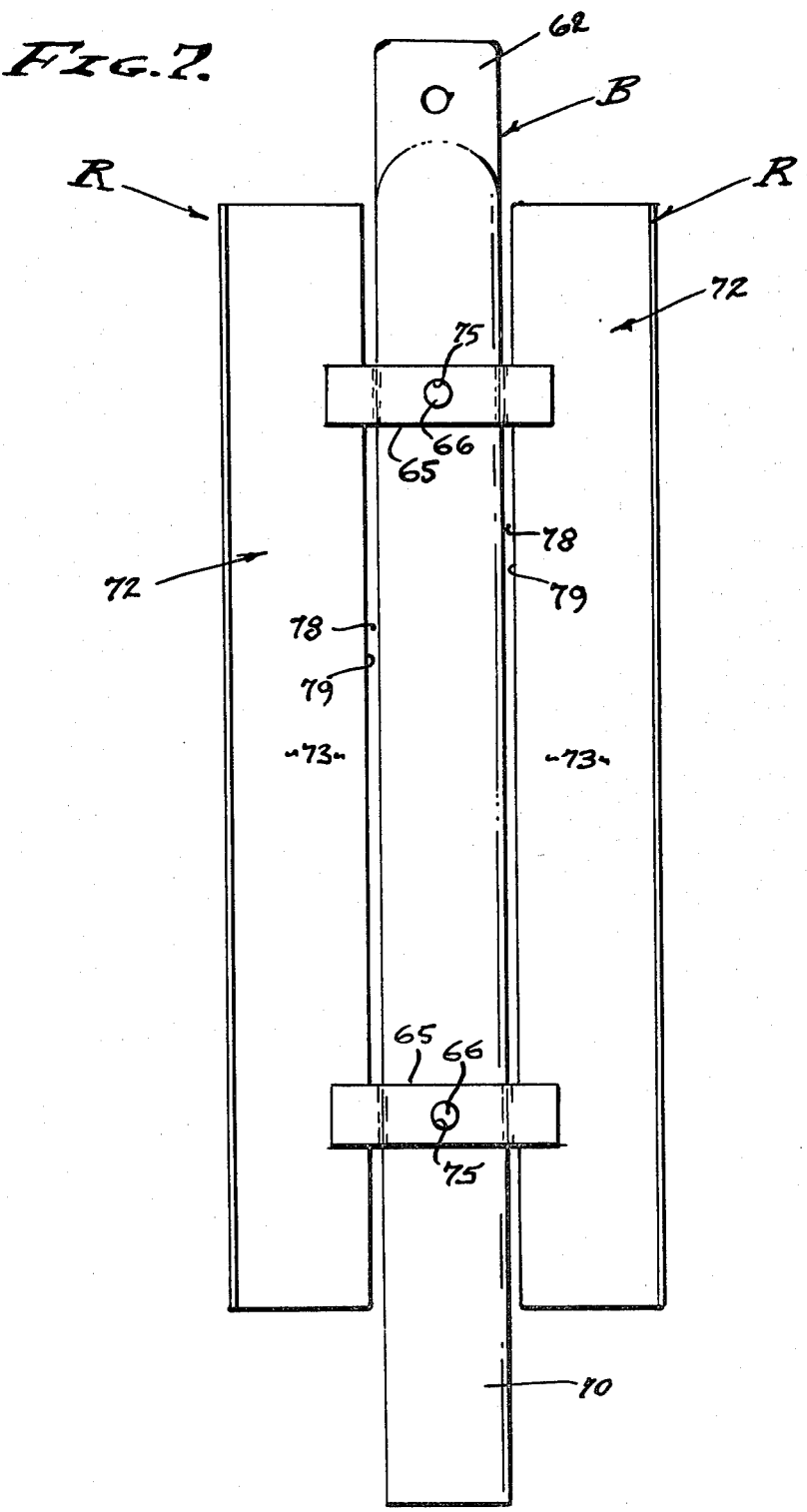

OVEN BURNER RADIANT

This application is a continuation of copending application of the same title Ser. No. 900,588 filed Apr. 27, 1978, now abandoned, and as a continuation in part of copending application Ser. No. 749,316 filed Dec. 10, 1976, now U.S. Pat. No. 4,144,870, entitled ADJUSTABLE BROILER CONVECTION OVEN.

BACKGROUND

This invention relates to stoves used commercially for broiling meats and foods that require the application of heat from both above and below. That is, meats and foods that are to be broiled both top and bottom. Heretofore, top broilers have been used and the meats or foods turned over for heat application to both sides. Also, fry plates have been used where the meats or foods lie in grease or oil, while broiler heat is applied from above. Stove broilers are usually referred to as ovens into which moveable grills support the meats or foods, with top and/or bottom heating elements, and with vertical adjustment of the said grills. Characteristically, the meat or food supporting element of the broiler under consideration is a plate or griddle which is heated from beneath and which is positionable in spaced relation to radiant heat from above. A feature of the cooking method involved is that the meats or foods are not turned, and that cooking time is minimized with low temperature application from both below and above. The meats and foods do not steep in their own grease or oils, the plate or griddle being disposed to drain off while the meats or foods are simultaneously broiled from both top and bottom sides. It is a general object of this invention, therefore, to provide a stove for low temperature broiling without charing and with the elimination of grease during the cooking process.

Stove broilers of the type under consideration must be versatile in their capability to cook (1) meats such a steaks, chops, fish and hamburger; (2) ham and toast; (3) bacon, eggs, omelettes, sausage and breakfast rolls; (4) grilled cheese sandwiches, french toast, pizza, lobster, spanish dishes; and (5) chicken, biscuits and baked potatoes. The foregoing foods are listed according to their relative proximity requirements to the radiant top heat and comparable applied bottom heat. Generally, meats except chicken are positioned close to the top heat and comparable bottom heat applied, and when not using top heat it is desirable to lower and remove the food from said top heat. With the present invention, the top heat is fixedly positioned, while the bottom heat moves with the positionable food supporting plate or griddle. In practice, the plate or griddle is carried by an elevator-drawer to be raised and lowered and removable sufficiently from the oven chamber for loading and/or for cooking without top heat. The energy source for heating is gas and the positioning of the plate or griddle provides exposure for loading and unloading, there being means to compensate for the weight of food applied so as to maintain a selected position with assurance.

Heat sources for broiling have relied upon the heat radiating capability of the heating element or burner per se, and in some instances upon radiant devices applied thereto such as ceramic radiants applied to gas flames. The said ceramic radiants are heavy and cumbersome, as well as fragile; it being an object of this invention to provide a more efficient space saving radiant that is durable. With the present invention, metalic radiant elements of low mass are disposed in close proximity to the direction of the gas flame for efficient heat absorption and radiation. It is also an object of this invention to provide a burner and radiant combination which is easily manufactured and of durable character that is readily maintained. With the present invention, assembly and disassembly is obviously simple and conducive to cleanliness.

Burners of the type with which this invention is concerned are characterized by sheet metal radiants that extend radially from the burner tube. The primary gas-to-air mixture is controlled by a shutter at the gas valve that supplies the tube, and little or no consideration has been given to secondary combustion air; namely the surrounding air that enters into the flame to affect combustion. Heretofore, wing-type burner radiants of the type under consideration have been sheet metal plates coextensively engaged with and over the burner tube, and consequently preclude the secondary air from entering into combustable contact with the top of the flame running beneath the radiant, and only the bottom of the flame receives any benefit from the surrounding secondary combustion air. It is an object of this invention to enhance combustion and to provide a more efficient flame and radiant heat by exposing the upper side of the flame to secondary combustion air, thereby super-heating the radiant with the least volume of gas. With the present invention, the radiants per se at each side of the burner tube are spaced therefrom to form secondary combustion air slots coextensive with the burner tube and radiant combination. This effectively doubles the combustion effect of secondary combustion air.

Low heat cooking is an object of this invention, with gas burner efficiency of prime concern. The oven chamber is open with the draft upward and inherently beneath the top plate or griddle and toward a rear vent. Characteristically therefore, there are upper and lower griddles, a warmer plate or griddle and a broiler plate or griddle. The former is stationary and heated by the radiants of and by the top burners, and the latter is dynamic and adapted to be moveably positioned as circumstances require. The top griddle is for maintaining the heated condition of foods and for warming, while the lower griddle is primarily for the cooking process.

SUMMARY OF INVENTION

The stove is shown in its preferred form as a front opening cabinet C adapted to be leveled in a free standing position spaced a safe distance from building structure walls. The sides and back of the cabinet C are insulated, the front is open, and the bottom comprised of a drip pan P. There are upper and lower griddles G1 and G2, the former griddle G1 fixed and substantially coextensive with the top of the cabinet C, and the latter griddle G2 moveable into elevated positions within the cabinet oven chamber. There is an elevator-drawer A that carries the griddle G2, compensating for the weight or the foods supported thereby and moveably carrying bottom burners B2 in uniformly close proximity beneath the lower griddle G2. Both the top and bottom burners B1 and B2 are fixedly positioned in uniformly close proximity beneath their respective griddles G1 and G2, there being a flexible gas connector means H supplying the lowermost moveable burners B2. A feature is the radiants R coextensively spaced from the top burners B1 which overlie the horizontal flame jets thereof to efficiently absorb heat for downward radiation onto the food to be broiled thereby. Simultaneously, the food supporting lower griddle G2 applies bottom heat to the food load without frying as will be described.

DRAWINGS

The various objects and features of this invention will be fully understood from the following detailed description of the typical preferred form and application thereof, throughout which description reference is made to the accompanying drawings, in which:

FIG. 3 is an elevational section showing the connector means to the moveable griddle shown in FIG. 2.

FIG. 4 is an enlarged detailed sectional view of the radiant burner and taken as indicated by line 4—4 on FIG. 2.

FIG. 5 is an exploded perspective view of the radiant burner components.

FIG. 6 is a perspective view of the air shutter that controls primary combustion air to the burner, and FIG. 7 is a plan view of the burner and radiant combination taken as indicated by line 7—7 on FIG. 4.

PREFERRED EMBODIMENT

Figure 1:
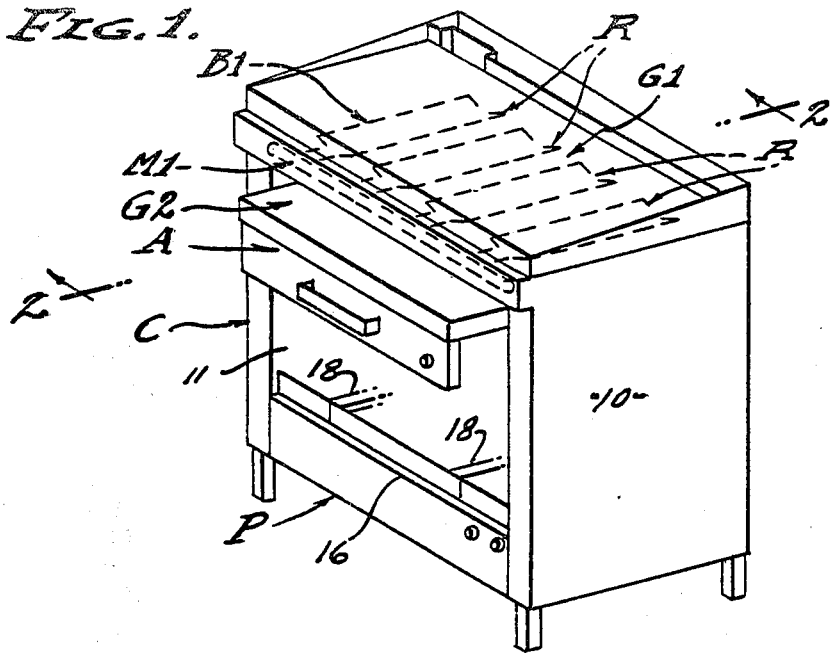
FIG. 1 is a perspective view of an adjustable broiler warming oven.
Figure 2:
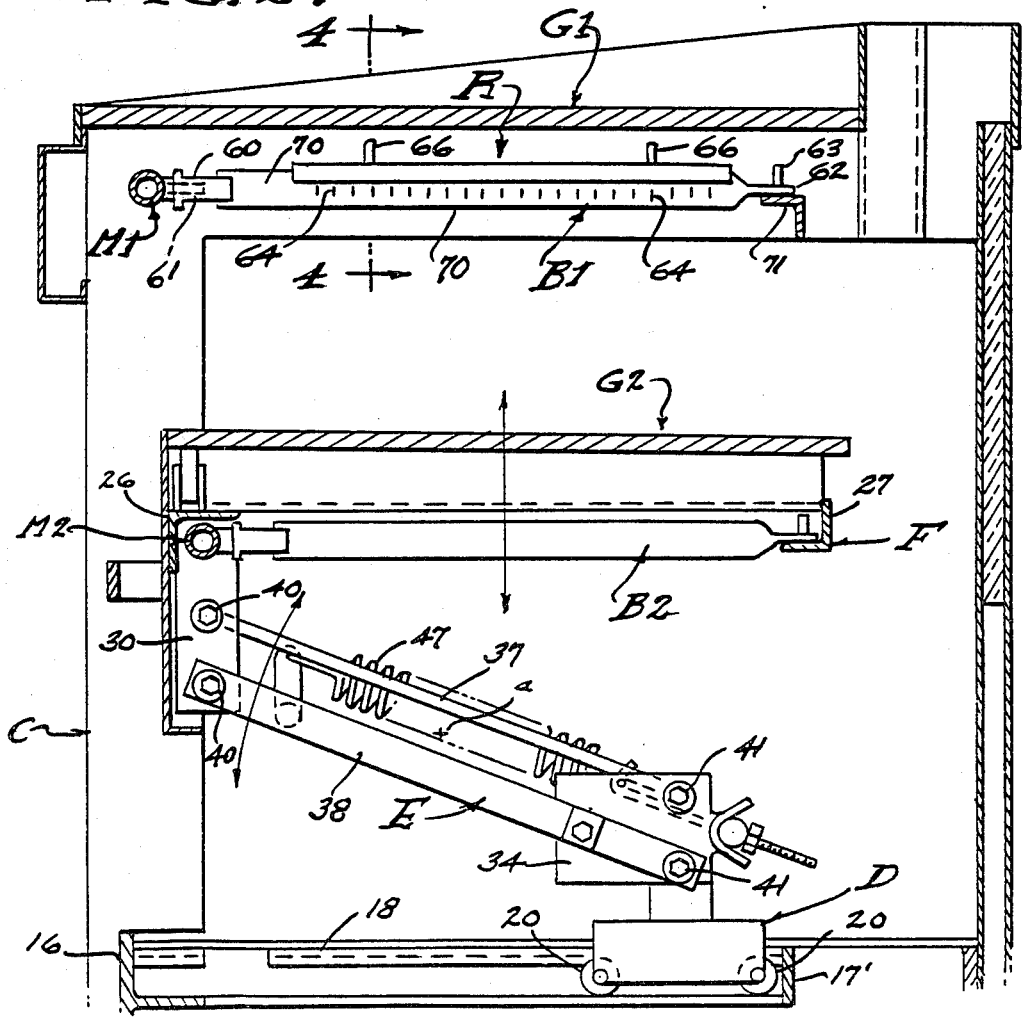
FIG. 2 is an enlarged sectional view taken substantially as indicated by line 2—2 on FIG. 1.

The adjustable broiler is incorporated in the front opening cabinet C comprised of a back panel and parallel side panels 10 and 11 provided with front and rear leveling means such as floor engaging screws (not shown). The cabinet panels are of double walled sheet metal construction with insulation therebetween, supported above the floor and having coplanar front and back top edges establishing the front opening oven chamber, and closed at the back, and closed at the bottom by the drip pan P. At an intermediate height there are front and rear headers 16 and 17' extending between the side panels 10 and 11, and supporting spaced tracks 18 extending from the back to the front opening of the oven chamber.

The elevator-drawer A functions to be loaded with food and to be positioned with respect to the top heat burners B1, and to carry the bottom heat burners B2. Accordingly, the elevator-drawer A comprises a moveable frame F carried by a carriage D through lift arms E arranged to maintain a near horizontal disposition of said frame and bottom griddle G2 and burners B2 supported thereby. As shown, the frame F is adapted to be positioned vertically with respect to the carriage D, while the elevator-drawer A as a unit is adapted to shift horizontally into and out of the oven chamber. The griddle G2 overlies the frame F while the burners B2 underlie the same, there being a gas manifold M2 carried by the frame in the plane of the burners B2 to supply the same. The frame F is a rectangular or square member disposed at various levels within the oven chamber, preferably a perimeter frame comprised of spaced and parallel side rails rigidly joined to front and rear cross beams 26 and 27. The carriage D is supported by the tracks 18 and moves horizontally upon front and rear spaced rollers 20. The lift arms E operate between the brackets 30 and mounting plates 34, there being upper and lower arms 37 and 38 extending forwardly and upwardly from the said mounting plates to the said frame brackets. In accordance with this invention, the griddle G2 is dipped or pitched laterally and/or rearwardly so as to drain off grease and fats and thereby provide contact broiling as distinguished from frying. A feature that controls rearward drip or pitch is the trapezoid and more precisely trapezium configuration of the arms and their vertically spaced mounting and support pivots 40 and 41 which are more closely spaced at the brackets 30 than they are at the mounting plates 34. Thus, it will become apparent that the trapezium and controlled rearward dip is unobvious, while extremely effective in the elimination of fats rendered in the cooking process, whereby frying is eliminated and replaced by bottom griddle broiling. The dynamic weight of the elevator-drawer A hereinabove described is balanced by a compensator means S comprised of a tension spring 47 pulling in a controllably shifting alignment disposed substantially above the center of effort a of the lift arm. The flexible gas connector H is provided to conduct gas to the moveable burners B2, and to this end comprises a flexible hose 55 coupled between the manifold M2 and the output connection of a gas supply valve.

A feature of this adjustable broiler is the top heat comprised of the burner B1 and the manifold M1 therefor, there being metallic radiants R of low mass disposed to be heated by the lateral jets of flame emitting from the burners B1. In practice, there is a plurality of parallel burners B1 (four indicated in FIG. 1) extending fore and aft and normal to the manifold M1 carried transversely of the cabinet C between the side panels 11. The burners B1 are stationary, having air shutters 60 supported over a nipple 61 projecting from the manifold, and a flange 62 engaged over a pin 63, assuring a horizontal positioning of the gas jets 64 that emanate at opposite sides of the burner tube substantially coextensive therewith. As shown, the radiants R comprise plates of non corrosive steel or the like extending parallel at each side of the burner tube and each in a plane disposed with and above the flame jet from which heat is absorbed. At or near the tip of the flame jet, the radiant R is upturned for rigidity and to direct the flame tip upwardly. Thus, the radiants R are provided in pairs that embrace each manifold tube, there being a yoke 65 joining the opposite ends of the radiants to carry them on the manifold tube and located thereon by pins 66 engaged through said yoke.

The burner and radiant components are best illustrated in FIGS. 5 and 6 of the drawings, showing the disassembly thereof and the obvious arrangement of components as they are adapted to be separated for cleaning. As shown, the burner B1 is a tube 70 open at one end and closed at the other end by the flange 62 of the tube wall pinched or pressed together on the transverse median plane of the tube. A horizontally disposed header 71 engageably supports the flange 62 positioned thereon by the pin 63, there being a pin 63 projecting from the header to position each burner tube. The gas jets 64 are disposed in a series along the said median plane at opposite sides of the tube 70, and comprised of vertical slots from which the combustible mixture of gases emanates horizontally. The pins 66 project vertically from the top of the burner tube 70, and radially therefrom to guide and locate the radiant R next described.

The radiant R is comprised of a pair of divergently related sheet metal angles 72, preferably made of a stainless steel 0.050 inch thick, adapted to be coextensively heated to a red-hot heat radiating condition. As best illustrated in FIG. 4, opposite rows of flames emanate horizontally at each side of the burner tube 70, said flames tending to rise with the natural upward convection of heat generated thereby. Accordingly, the radiant angles 72 are comprised of a cover plate 73 that overlies the row of flames, being juxtaposed thereto and extending radially from the periphery of the tube 70. In practice, the cover plate 73 flares upwardly at about 7½° and extends to the flame tip where it has a guide plate 74 that turns the flame gases vertically. In the burner shown, the tube 70 is one inch diameter and the cover plates are each one inch in width (nominal dimensions), the yoke 65 being of compatible metal welded to the pair of radiants and guided into position by openings 75 therethrough engaged over the pins 66.

The air shutter 60 is shown in FIG. 6 as an inwardly flanged sleeve having an opening 76 to slide onto the nipple 61, and an apertured skirt 77 to slide adjustably onto the open end of the burner tube 70. The shutter 60 is frictionally positioned and/or secured to the tube 70 as by means of a suitable screw fastener or the like, as circumstances require. The primary combustion air is controlled by the shutter 60 to control the burning of gas discharged from the gas jets 64.

Secondary combustion air is beneficially supplied to the burning flame from air beneath said flame, but is normally precluded from beneficially affecting the top of the flame that plays against the radiant, since prior art constructions have shut off that access to top air. However, and in accordance with this invention, the advantageous effect of secondary combustion air from above is provided, supplying air between the burner tube and the radiants. As best illustrated in FIGS. 4 and 7 of the drawings, there is an opening 78 formed by the inner edge 79 of each radiant angle 72 spaced from the outer surface of the burner tube 70. As shown, the edges 79 are also parallel to the opposite surfaces of the burner tube, immediately above the gas jets 64, thereby permitting the downward flow of secondary combustion air from above the burner-radiant combination. Since the radiant angles 72 are disposed slightly above the jet openings and flames emanating therefrom, the downward entry of secondary combustion air passes through the openings 78 and beneath the radiant angles 72 and over the flames to comingle with the burning gases. Accordingly, radiant heat is intensified and monoxide emission is reduced. In practice, the prior art radiant heat is 1100°-1200° F., whereas the radiant heat with the present invention is 1400°-1700° F. Furthermore, this increased temperature is produced with a smaller flame with more complete combustion, due to the additional air entering between the radiant and the flame. The area of opening 78 is critical and substantially as shown, acting as a shutter control.

From the foregoing it will be seen that I have provided improved top burner radiants for broiling in a front opening oven chamber with convection air flow. In practice, the rear edge of the top griddle G1 is spaced substantially forward of the rear panel 10 for venting all hot gases, while the entire front area of the oven chamber is open for induction of clean air over the foods being broiled. As shown, there is ample ventilation around the entire elevator-drawer A and bottom contact griddle G2 for the natural convection flow of air above and below said griddle and rearwardly and upwardly through the chamber and out the flue area. The importance of leveling the stove cabinet C will be apparent when considering the effect of the permanent and controlled dip or pitch of the griddle G2, and all to the end that low heat top and bottom broiling becomes feasible in a convection flow oven that remains open for observation of the cooking process and for facility of loading and unloading the foods therefrom. The various weights of foods are readily compensated for and selected broiling positions maintained with assurance. And, all stove parts and elements are readily accessible and/or removable for cleaning and servicing with facility.

Having described only a typical preferred form and application of my invention, I do not wish to be limited or restricted to the specific details herein set forth, but wish to reserve to myself any modifications or variations that may appear to those skilled in the art as set forth within the limits of the following claims:

I claim:

1. An improved radiant heat burner for gas stoves, and including; a burner tube receiving primary combustion air from a shutter control and with a row of jet openings at a horizontal median plane for directing laterally disposed flames with said primary combustion air from the side of said burner tube, and a flat imperforate radiant of substantially non-corrosive material positioned to the side of the burner tube by at least one yoke and juxtaposed horizontally above said row of jet openings and offset immediately above said median plane, there being an opening between the burner tube and the juxtaposed radiant admitting secondary combustion air from above the burner tube to enter beneath the radiant and over the flames for efficient combustion and intense heating of said radiant.

2. The improved radiant heat burner as set forth in claim 1, wherein the opening between the burner tube and the radiant is coextensive with the row of jet openings and said flame emanating therefrom.

3. The improved radiant heat burner as set forth in claim 1, wherein the radiant has an inner edge parallel to and spaced from the burner tube to form said opening therebetween and coextensive with the row of jet openings and said flame emanating therefrom.

4. An improved radiant heat burner for gas stoves, and including; a burner tube receiving primary combustion air from a shutter control and with opposite rows of jet openings at a horizontal median plane for directing diametrically opposite laterally disposed flames with said primary combustion air from opposite sides of said burner tube, and a pair of flat imperforate radiants of substantially non-corrosive material positioned to opposite sides of the burner tube by at least one yoke and one juxtaposed horizontally above each of said rows of jet openings and offset immediately above the said median plane, there being an opening between each radiant at opposite sides of the burner tube admitting secondary combustion air from above the burner tube to enter beneath the radiants and over the flames for efficient combustion and intense heating of said radiants.

5. The improved radiant heat burner as set forth in claim 4, wherein the openings between opposite sides of the burner tube and said radiants are coextensive with the rows of jet openings and said flames emanating therefrom.

6. The impoved radiant heat burner as set forth in claim 4, wherein each of the radiants has an inner edge parallel to and spaced from the burner tube to form said openings coextensive with the rows of jet openings and said flames emanating therefrom.

* * * * *